United States Patent [19]
Fuchs

[11] Patent Number: 5,829,510
[45] Date of Patent: Nov. 3, 1998

[54] EXOTHERMIC WELDING CRUCIBLE AND METHOD

[75] Inventor: Jean Claude Fuchs, L'Etrat, France

[73] Assignee: Erico International Corporation, Solon, Ohio

[21] Appl. No.: 843,263

[22] Filed: Apr. 14, 1997

Related U.S. Application Data

[60] Provisional application No. 60/015,609 Apr. 18, 1996.

[51] Int. Cl.[6] .................................................. B23K 23/00
[52] U.S. Cl. .............................. 164/54; 164/335; 249/86
[58] Field of Search ...................... 164/54, 335; 249/86, 249/83

[56] References Cited

U.S. PATENT DOCUMENTS

| | | | |
|---|---|---|---|
| 2,360,758 | 10/1944 | Cadwell | ..................................... 249/86 |
| 3,113,359 | 12/1963 | Burke . | |
| 3,234,603 | 2/1966 | Leuthy et al. . | |
| 3,255,498 | 6/1966 | Leuthy et al. . | |
| 5,715,886 | 2/1998 | Fuchs | ........................................ 164/54 |

OTHER PUBLICATIONS

"Cadweld® Electrical Connections, Materials and Tools", pp. A3–A8; Dec. 1, 1986 by Erico Products Inc.
"Erico® Electrical Products, Cadweld® Gridmarker™" p. A7Q; Mar. 1995 By Erico Inc.

Primary Examiner—Kuang Y. Lin
Attorney, Agent, or Firm—Renner, Otto, Boisselle, Sklar

[57] ABSTRACT

A crucible for exothermic welding includes a frame and two semi-cylindrical or rectangular refractory blocks which include abutting planes through a reaction chamber and a sprue hole. One block is mounted for movement with respect to the other from an aligned mating position forming the chamber and sprue hole to an offset position which movement loosens slag formed during the welding process, and greatly facilitates cleaning. Adjustable spring ball rollers maintain the parting plane pressure.

16 Claims, 2 Drawing Sheets

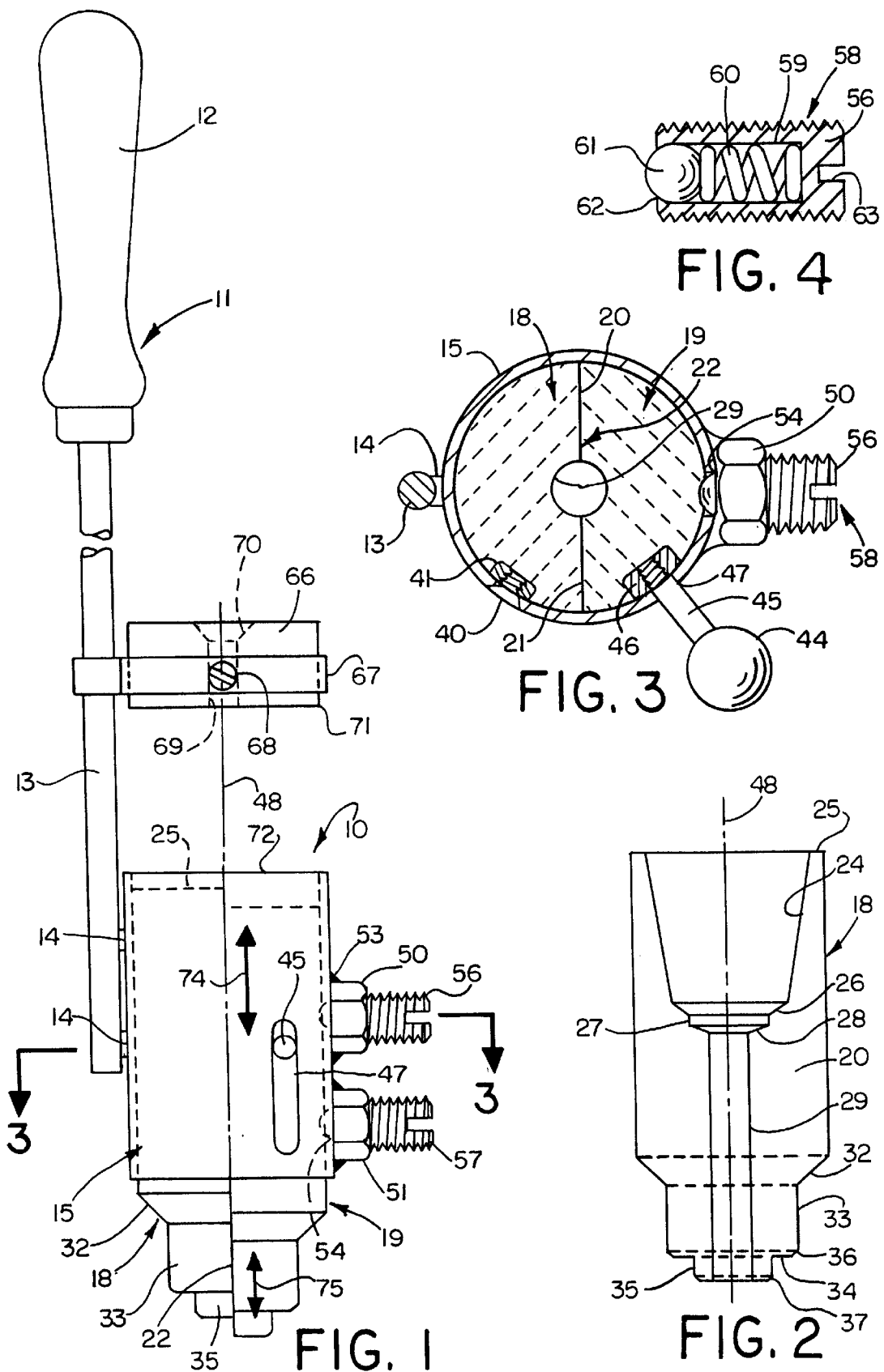

EXOTHERMIC WELDING CRUCIBLE AND METHOD

This application is a Continuation of Provisional Application Ser. No. 60/015,609, filed Apr. 18, 1996.

This invention relates generally as indicated to an exothermic welding crucible and method, and more particularly to an efficient, easy to use and clean crucible with a longer life.

BACKGROUND OF THE INVENTION

Reusable crucibles are widely used with reusable and single use molds in the exothermic welding process to make, for example, high amperage low resistance electrical connections. Such reusable molds, single use molds, and crucibles are sold, for example, under the well known trademarks CADWELD® and ONE-SHOT® by Erico International of Solon, Ohio USA.

The crucible normally sits on top of the mold and is usually formed of a single block of refractory material such as graphite. If formed of two parts, the parts are usually held together by a toggle clamp for opening and closing, and hinged along a vertical axis.

The crucible includes a chamber holding the exothermic material on top of a fusible disc. A sprue or tap hole below the disc communicates with the tap hole of the mold leading to the weld chamber. When a measured and controlled quantity of exothermic material is ignited in the crucible chamber, it forms molten metal which fuses the disc, permitting the molten metal to flow downwardly into the weld chamber to weld any parts exposed to the chamber. The mold in a reusable mold system and the crucible are cleaned of slag and spatter for reuse.

In the crucible, the slag and residue collects at the bottom of the chamber and along the tap hole. It fairly quickly solidifies after the process and when the crucible is disassembled, the chamber and tap hole are cleaned. Special tools may be provided for this purpose. The use of tools to remove the slag is time consuming and contributes to the wear of the graphite block, thus shortening the useful life of the crucible. The useful life of the crucible and its ease of operation and cleaning contributes greatly to the economics of the high quality welds made by the process. It would accordingly be beneficial to have a crucible easy to operate and easy to clean without the use of special tools.

SUMMARY OF THE INVENTION

The crucible includes a crucible handle and frame which supports two block halves which may be substantially identical and having faces which mate on a common parting plane in which respective faces recesses are formed for the chamber and the sprue hole. The parting plane faces extend through the axis of the chamber and sprue hole. The two blocks may be semi-cylindrical or rectangular and the frame shaped accordingly. One of the block halves is mounted for axial movement with respect to the other, while such other half is fixed to the frame. A slide handle is mounted on the movable block half projecting through an axial slot to effect such movement. A pair of adjustable spring pressure roller balls is mounted in the frame to bear against the movable half urging such half toward the parting plane. The operator after the weld using the handle slides the movable half downwardly. It has been discovered that this loosens the slag at the bottom of the crucible chamber, and within the sprue hole. The operator then simply turns the crucible upside down and the loose debris falls out.

The crucible handle projecting from the frame has a refractory lid mounted thereon for swinging and axial movement. When closing the crucible, the lid telescopes into the top of the frame, and a hood-like smoke and spark reducer with a safety igniter may telescope over the lid when closed. The lower end of the crucible may be formed into a tubular nozzle to fit into the top of a wide variety of molds, both reusable and single use.

To the accomplishment of the foregoing and related ends, the invention then comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

FIG. 1 is a side elevation of the crucible with the lid open and the two block halves slightly offset;

FIG. 2 is a parting plane elevation of one of the block halves;

FIG. 3 is a slightly enlarged horizontal section taken substantially on the line 3—3 of FIG. 1;

FIG. 4 is an axial section of one of the adjustable rolling spring ball assemblies employed;

DETAILED DESCRIPTION OF THE PREFERRED EMBODIMENTS

Figure 5:
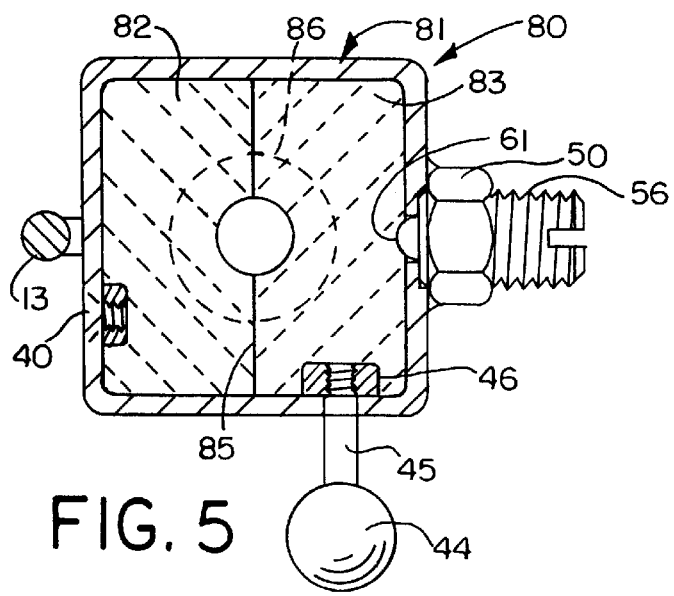
FIG. 5 is a similar section of a rectangular block version of the crucible.

Referring initially to FIG. 1, there is illustrated generally a crucible 10 in accordance with the present invention. The crucible includes a crucible handle 11 which includes a hand grip 12 and a cylindrical rod 13. The lower end of the rod is fixed at 14 to a cylindrical frame 15. The frame may be made of a corrosion resistent material such as stainless steel.

As seen additionally in FIGS. 2 and 3, the frame 15 surrounds two essentially identical refractory blocks 18 and 19. The two block halves include opposed diametrical faces 20 and 21, respectively, which mate or abut on a common diametral parting plane 22. It is in such opposed faces 20 and 21 in which recesses are formed which when the parts are joined, form the chambers and passages hereinafter described and as particularly shown in FIGS. 2 and 6.

At the top of the block halves, a conical reaction chamber is formed as seen at 24 which opens to the top 25. The bottom of the reaction chamber is provided with a conical shoulder 26, a short vertical step 27, and a further smaller conical shoulder 28 leading to vertically extending sprue or tap hole 29 which extends from the reaction chamber to the bottom of the crucible block halves.

The exterior of the block nearer the bottom is provided with a conical shoulder 32 which extends to a cylindrical extension 33 ending at right angle shoulder 34 which forms an annular reduced diameter projecting nozzle 35. Sharp corners are removed from the shoulders by the bevels indicated at 36 and 37.

Both block halves are made of a machined refractory material such as graphite. Extra care is taken to form the faces of each block half flat and smooth. Such refractory graphite material has a natural lubricity which enables one block half to slide easily with respect to the other along its parting diametral face.

The other block half 18 is fixed to the frame 15 by one or more fasteners indicated at 40 in FIG. 3. The fasteners may be mounted directly into the graphite or into inserts as seen at 41.

The movable block half 19 is not fastened to the frame 15, but instead includes a protecting slide handle 44. The stem 45 of the slide handle may be threaded into insert 46 in the movable block half and such stem also projects radially through axial extending slot 47 in the frame. Such slot extends parallel to the axis of the crucible which is seen at 48.

Mounted on the exterior of the frame normal to the parting plane 22 are two relatively large collars 50 and 51 which are internally threaded and which may conveniently take the form of large nuts. The collars are welded to the exterior of the frame as indicated at 53 and each is concentrically positioned around holes in the frame seen at 54.

Threaded within the projecting collars are the externally threaded bodies 56 and 57 of spring loaded ball assemblies as shown at 58 in FIG. 4. Each assembly includes the externally threaded body such as 56, a blind bore 59 in which is positioned a spring 60 urging ball 61 against a constriction 62 at the outer end of the bore. The constriction acts as a bearing for the ball permitting the ball to rotate within its spring loaded captured position shown. The end of the housing is provided with a screw slot seen at 63 enabling it to be adjusted into and out of the respective threaded collar. The pitch of the threads is selected to be relatively low or at a wedge angle so that when the pressure regulating ball assembly is adjusted, it will remain in its adjusted position. The projection of the ball 61 through the frame seen in FIG. 3 is slightly exaggerated. The purpose of the spring loaded rolling balls is to assure pressure of the movable part against the fixed part at the parting plane. As the parts wear, the pressure regulators may simply be tightened to assure the proper pressure both to avoid leakage and to permit relative indexing or sliding.

Reverting to FIG. 1, it will be seen that the crucible handle 13 has mounted thereon a refractory crucible lid 66. The top or lid 66 is supported by a swinging and sliding frame 67 mounted on the handle rod 13. The lid is held in place in the frame 67 by a fastener seen at 68. The lid is provided with a central hole 69 which has a relatively large funnel configuration 70 at the top. It is noted that the lower end of the lid seen at 71 projects slightly from the encircling frame 67. This permits the lower end of the lid to telescope within the upper end 72 of the frame so that the lid seats directly on top of the crucible blocks. The assembled condition is seen in FIG. 6.

In any event, with the handle 44 projecting through the slot 47, the movable block half 19 may be moved in the direction of the arrows 74 and 75 in FIG. 1. In this manner the two halves may be axially offset.

Referring now to FIG. 5, there is illustrated another form of crucible in accordance with the present invention shown generally at 80. The frame shown at 81 is generally rectangular and the two block halves 82 and 83 are also generally rectangular, each occupying half of the space inscribed by the frame. The half 82 is fixed to the frame by the fastener indicated at 40 while the half 83 is movable axially of the frame through the action of the handle 44. The spring loaded balls urge the two halves together at the parting plane 85. The respective abutting faces of the blocks at the parting plane 85 are formed with the recesses forming the reaction chamber and sprue hole and the lower end of the mating blocks may be formed with a circular nozzle seen at 86.

Figure 6:
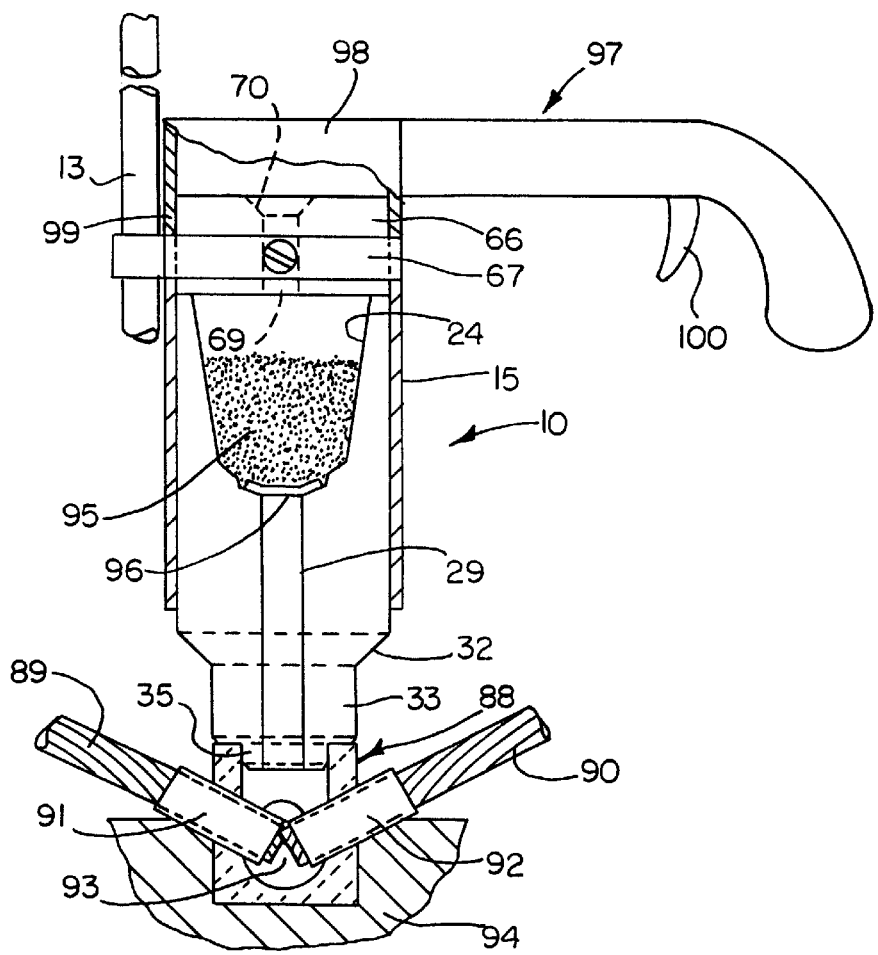
FIG. 6 is a fragmentary axial section of the crucible of FIG. 1 assembled with a mold and ready for ignition.

Referring now to FIG. 6, there is illustrated the crucible assembled with a mold 88 to form a high amperage low resistance electrical connection between the conductors illustrated in the form of stranded cable 89 and 90. The cables extend through inclined metal sleeves 91 and 92, respectively, into the weld chamber 93 which opens to the top of the mold. The mold is held in a fixture 94. As can be seen, the nozzle 35 of the crucible telescopes into the top of the mold. Because of the interfit between the nozzle and the top of the mold, the crucible will stand unsupported in the vertical position shown.

A charge of exothermic material has been inserted into the reaction chamber as seen at 95 and is supported on a fusible disc 96. Starting powder may be inserted on top of the charge 95 through the hole 69 in the closed lid 66. Some of the starting powder will accumulate on the funnel surface 70. Positioned over the closed lid is an igniter 97 which incorporates a hood 98 having a skirt 99 which telescopes over the projecting upper end of the lid 66 extending beyond the encircling frame 67. The igniter is in the form of a flint gun and when the trigger 100 is pulled a spark is created igniting the starting powder which in turns ignites the exothermic material to produce the reaction which converts the material into molten metal. The igniter 97 with the integral hood 98 reduces smoke and sparking which would otherwise occur.

When the molten metal forms by the initiation of the reaction, the molten metal fuses the disc 96 shortly after the reaction has begun and the molten metal flows down the sprue hole 29 into the weld chamber 93 welding the cable ends to each other. Slag and residue will form at the bottom of the reaction chamber and along the top of the sprue hole. It quickly hardens as the energy is dissipated. The safety igniter is removed from the top and the lid is elevated and offset. While the crucible is held in one hand, the operator with the other hand grasps the handle 44 and moves the movable half block axially downwardly away from the fixed half. The offset of the two halves loosens the solidified slag. The operator then simply turns the crucible upside down and the slag falls out the top. With the crucible blocks reassembled in the proper transverse alignment, the crucible is ready for recharging and reuse.

The proper sliding seal between the fixed and movable crucible blocks is maintained by the adjustable rolling balls permitting the crucible to be used and reused for a long service life. The crucible is accordingly quickly cleaned without the use of tools which may otherwise damage or wear the interior surfaces.

The nozzle on the end of the two crucible parts may be designed to fit and telescope into a variety of single use molds of the type illustrated.

To the accomplishment of the foregoing and related ends, the invention then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

I claim:

1. A crucible for exothermic welding and the like, including a chamber adapted to hold exothermic material and a sprue hole leading from said chamber, said crucible being formed of two similar blocks of refractory material having faces abutting each other at a common parting plane, with mating recesses in each respective face forming the chamber and sprue hole, and means to slide one block with respect to the other along the parting plane faces to loosen slag and debris.

2. A crucible as set forth in claim 1 including a frame, said other block being fixed to said frame, and said one block being movable with respect to said other block and frame.

3. A crucible as set forth in claim 2 including an elongated slot in said frame extending parallel to the common parting plane, and a handle extending through said slot and fixed to said one block.

4. A crucible as set forth in claim 3 including spring pressure means on said frame urging said one block toward said other block.

5. A crucible as set forth in claim 4 wherein said spring pressure means is oriented substantially normal to said parting plane.

6. A crucible as set forth in claim 5 wherein said spring pressure means comprises spring loaded rolling balls.

7. A crucible as set forth in claim 6 wherein said spring pressure means is adjustable with respect to said frame.

8. A crucible as set forth in claim 1 including a frame, and spring pressure means on said frame urging said one block toward said other block.

9. A crucible as set forth in claim 8 wherein said spring pressure means comprises spring loaded rolling balls.

10. A crucible as set forth in claim 9 wherein said spring pressure means is adjustable and oriented substantially normal to said parting plane.

11. A method of cleaning a crucible for exothermic welding having an upper reaction chamber and a lower sprue hole comprising the steps of forming the crucible into two parts abutting along a sliding plane through the chamber and sprue hole, maintaining the parts transversely aligned to form the chamber and sprue hole for use in exothermic welding, and then moving one part offsetting the two parts along such sliding plane to loosen any slag or debris formed in the chamber and sprue hole during such welding.

12. A method as set forth in claim 11 including the step of offsetting one part with respect to the other downwardly.

13. A method as set forth in claim 11 including the step of urging the moving one part against the other.

14. A method as set forth in claim 13 including the step of urging the moving one part against the other substantially normal to the sliding plane.

15. A method as set forth in claim 11 including the step of adjusting the pressure of the moving one part against the other at the sliding plane.

16. A method as set forth in claim 11 including the step of inverting the crucible after such offsetting to remove any loosened slag or debris.

\* \* \* \* \*